US007979798B2

(12) United States Patent
Wadhwa

(10) Patent No.: US 7,979,798 B2
(45) Date of Patent: Jul. 12, 2011

(54) SYSTEM AND METHOD FOR PROVIDING USER HELP TIPS

(75) Inventor: Gaurav Wadhwa, Narnaul (IN)

(73) Assignee: SAP AG, Walldorf (DE)

( * ) Notice: Subject to any disclaimer, the term of this patent is extended or adjusted under 35 U.S.C. 154(b) by 1316 days.

(21) Appl. No.: 11/429,226

(22) Filed: May 8, 2006

(65) Prior Publication Data

US 2007/0174150 A1 Jul. 26, 2007

(30) Foreign Application Priority Data

Dec. 30, 2005 (IN) ................ 25/DEL/2006

(51) Int. Cl.
*G06F 3/00* (2006.01)
*G06F 3/48* (2006.01)
(52) U.S. Cl. ........ 715/705; 715/711; 345/711; 345/715; 345/708
(58) Field of Classification Search .................. 715/705, 715/711; 345/711
See application file for complete search history.

(56) References Cited

U.S. PATENT DOCUMENTS

| 4,964,077 | A | 10/1990 | Eisen et al. |
| 5,103,498 | A | 4/1992 | Lanier et al. |
| 5,263,167 | A | 11/1993 | Conner et al. |
| 5,311,422 | A | 5/1994 | Loftin et al. |
| 5,432,940 | A | 7/1995 | Potts et al. |
| 5,485,544 | A | 1/1996 | Nonaka et al. |
| 5,513,308 | A | 4/1996 | Mori |
| 5,634,086 | A | 5/1997 | Rtischev et al. |
| 5,727,950 | A | 3/1998 | Cook et al. |
| 5,774,118 | A | 6/1998 | Hatakama |
| 6,005,569 | A | 12/1999 | Breggin |
| 6,014,134 | A | 1/2000 | Bell et al. |
| 6,275,227 | B1 * | 8/2001 | DeStefano ................ 369/30.01 |
| 6,341,359 | B1 | 1/2002 | Aiken et al. |
| 6,356,859 | B1 * | 3/2002 | Talbot et al. .................. 702/188 |
| 6,452,607 | B1 | 9/2002 | Livingston |
| 6,466,897 | B1 | 10/2002 | Yoshida |
| 6,542,163 | B2 * | 4/2003 | Gorbet et al. ................. 715/711 |
| 6,556,974 | B1 | 4/2003 | D'Alessandro |
| 6,597,314 | B1 | 7/2003 | Beezer et al. |
| 6,633,742 | B1 | 10/2003 | Turner et al. |
| 6,718,490 | B1 * | 4/2004 | Takemoto et al. .............. 714/47 |
| 6,801,751 | B1 | 10/2004 | Wood et al. |
| 6,944,624 | B2 | 9/2005 | Orton et al. |
| 7,001,183 | B2 | 2/2006 | Dowrick |

(Continued)

FOREIGN PATENT DOCUMENTS

JP 2021320 1/1990

(Continued)

OTHER PUBLICATIONS

"How to Use Microsoft Windows XP" by Walter Glenn, published by Pearson Education Inc. in 2002, pp. i, ii, 184, 185.

*Primary Examiner* — Boris Pesin
*Assistant Examiner* — Ece Hur
(74) *Attorney, Agent, or Firm* — Kenyon & Kenyon LLP

(57) ABSTRACT

In a system and method for providing user help tips, the system may determine a relevance to a user of a plurality of tips, may assign priority categories to the tips based on the relevance and may determine which tip to output based on the priority categories of the tips.

24 Claims, 2 Drawing Sheets

U.S. PATENT DOCUMENTS

| | | |
|---|---|---|
| 7,107,261 B2 | 9/2006 | Farrett |
| 7,272,793 B2 * | 9/2007 | Mutsuno et al. .............. 715/707 |
| 7,292,990 B2 | 11/2007 | Hughes |
| 7,340,501 B2 * | 3/2008 | Miida et al. .................. 709/203 |
| 2001/0034742 A1 | 10/2001 | Stinson |
| 2002/0015056 A1 | 2/2002 | Weinlaender |
| 2003/0030668 A1 | 2/2003 | Morrison |
| 2003/0099924 A1 | 5/2003 | Tsuboi et al. |
| 2003/0125924 A1 | 7/2003 | Lines et al. |
| 2003/0158618 A1 * | 8/2003 | Browning ...................... 700/99 |
| 2004/0006475 A1 | 1/2004 | Ehlen et al. |
| 2004/0015329 A1 | 1/2004 | Shayegan et al. |
| 2004/0036715 A1 | 2/2004 | Warren |
| 2005/0177373 A1 | 8/2005 | Cooper et al. |
| 2005/0235330 A1 * | 10/2005 | O'Donnell et al. ............. 725/87 |
| 2006/0168335 A1 | 7/2006 | Hodjat et al. |
| 2006/0287914 A1 * | 12/2006 | Shelley ........................... 705/14 |
| 2007/0027733 A1 | 2/2007 | Bolle et al. |

FOREIGN PATENT DOCUMENTS

| | | |
|---|---|---|
| JP | 4291415 | 10/1992 |
| JP | 7284034 | 10/1995 |
| JP | 10021037 | 1/1998 |
| JP | 2000137726 | 5/2000 |
| JP | 2000330683 | 11/2000 |

* cited by examiner

SYSTEM AND METHOD FOR PROVIDING USER HELP TIPS

BACKGROUND

Computer applications include a vast number of features, many of which are not intuitive. A user is therefore often unaware of or does not know how to implement many of the features. The user therefore often performs incorrect or inefficient steps, and thereby either fails to altogether accomplish or inefficiently accomplishes a goal the user intended to accomplish. Additionally, performance of incorrect steps often causes an error.

It is conventional for a computer system to provide user help information tips, such as a tip of the day, informing users about various features of the computer system. It is conventional for the system to record whether a particular tip has already been displayed, and to display only those tips that are not recorded as having been previously displayed. For example, until all system tips are displayed, the system displays a tip only if it has not been previously displayed. Once all system tips are displayed, the system repeats the tip display cycle.

However, often, many of the tips provided by the system relate to features that are not useful for a user in the user's daily tasks. For example, a tip may pertain to an aspect of the system seldom or never used by the user.

Thus, there is a need in the art for a system and method that selectively provides user-specific user help information tips in a manner tailored to a user's use of a computer system.

DETAILED DESCRIPTION

Embodiments of the present invention relate to a computer system and method that provide user-specific help information tips, where the provision of the tips is made in accordance with an estimated relevance of the tips to a user's interests. Embodiments of the present invention relate to a computer system and method that may selectively provide user help information tips based on a user's history of interaction with the computer system. The user history may indicate particular computer applications and/or application features most often used by a corresponding user, and/or particular tasks and/or subtasks most often performed by the user. A task may be associated with a plurality of applications. For example, to generate and transmit an e-mail regarding salary to a plurality of employees of a company, a combination of word processing, spreadsheet, and database management programs may be used. A task may represent a workflow, which may require implementing a plurality of different programs and/or program features for producing a desired outcome. A tip may be provided because of its direct or indirect association with an application, application feature, task, and/or subtask used or performed by the user.

Figure 1:
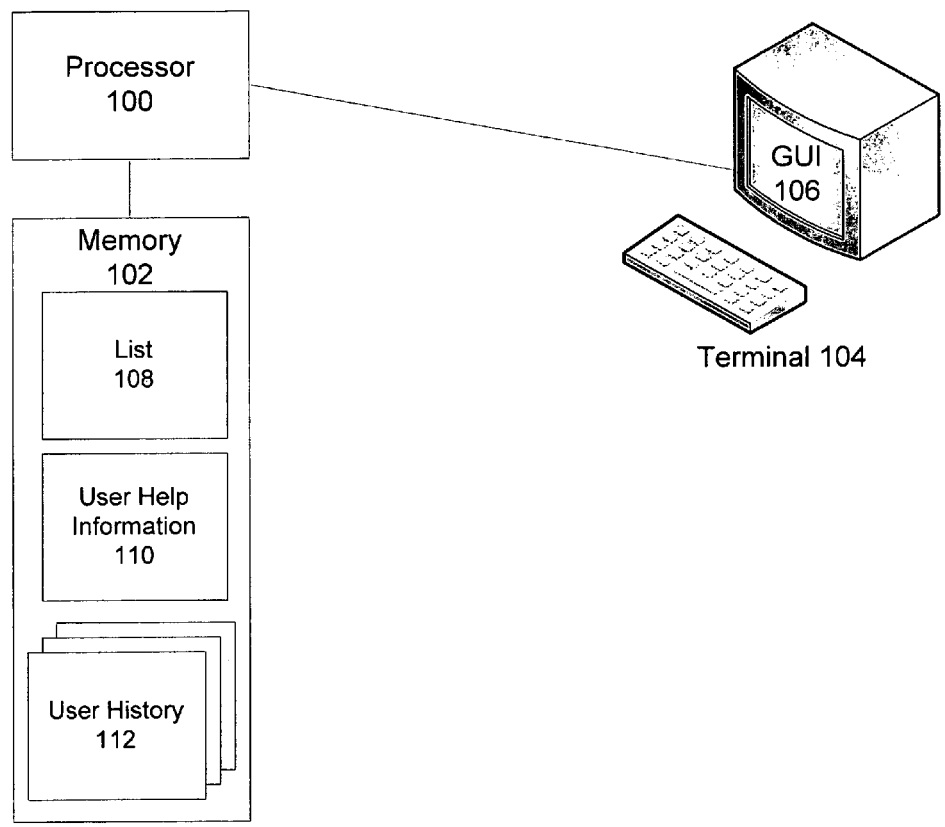
FIG. 1 is a block diagram that illustrates example components of a system according to an example embodiment of the present invention.

FIG. 1 is a block diagram that illustrates example components of a system according to an example embodiment of the present invention. A processor 100 may execute one or more sets of program instructions stored in a memory 102. The particular instructions executed by the processor 100 may depend on input provided by a user via an input device, e.g., a keyboard, a mouse, a touch pad, or any other conventional input device. The input device may be, e.g., at a terminal 104. At the terminal 104 may be an output device, e.g., a graphical user interface (GUI) 106. Output obtained during execution of the program instructions may be provided to the user via the output device. For example, the processor 100 may provide data for generating a display at the GUI 106 including the obtained output.

The system may store a list 108 of program instruction sets that may be executed by the processor 100. For one or more program instruction sets that may be executed by the processor 100, the list 108 may further include entries listing various aspects of the program instruction sets. Such program aspects may include program features, system tasks, problems, actions, and/or errors that may occur during execution of the program instruction sets. A problem may represent a failure by a user to act in a particular manner at a particular point during program execution, where it is determined that it is highly probable that acting in the particular manner was intended. An action may represent a performance by a user in a manner that does not produce an error, but does not allow for completion of a task. For example, for completion of a task, it may be required that the user enter a number amount in a particular field. While it may be that no error occurs when the user enters data other than a number amount, if the user later attempts to perform the task for which the number amount was required, the previous action may be deemed an error. An error may represent a faulty user operation.

For each entry or some entries in the list 108 there may be stored a corresponding solution or instruction set in a set of user help information 110. For example, the list 108 may include for each entry in the list 108 a pointer to or other identification of a corresponding solution or instruction set in the set of user help information 110. While FIG. 1 illustrates the list 108 and set of user help information 110 as separate data entities, such that linking of particular solutions or instruction sets to particular programs or program aspects is required, e.g., by pointers, it will be appreciated that the list 108 and set of user help information 110 may be combined into a single data entity. For example, they may be combined into a single flat file. It will also be appreciated that a single program or program aspect is not limited to one pointer. For example, for a particular program or program aspect, a combination of two or more solutions or instruction sets, e.g., which may each be used separately for other programs or program aspects, may be appropriate. In this instance, the list 108 may include two or more corresponding pointers for the particular program or program aspect. The list 108 may include entries that are not directly associated with a portion of the user help information 110. Instead, they may be associated with other entries in the list 108 that are themselves directly associated with one or more entries in the user help information 110. One or more entries in the user help information 110, or one or more combinations of entries of the list 108 and user help information 110 may be designated as a tip. In this regard, a particular user help information entry may be used as multiple tips since they may be for different entries in the list 108. For example, if a workflow requires implementation by a user of a particular program feature, an entry of the user help information 110 that is directly associated with the program feature may also be directly associated with the workflow. It may occur that the entry of the user help information 110 is assigned to a first priority category as a tip for the program feature but, for example, to a higher priority category as a tip for the workflow. This may occur if, for example, the user does not often implement the program feature or program of which the feature is a part, but does often implement the workflow or parts thereof, or if, for example, the user's role in a company is indicated to be such that implementation of the workflow is assigned to or expected of the user. With respect to a task, a tip may indicate the method, e.g., the steps of the method and/or sequence of performing the steps, for completing the task.

One or more entries in the list 108 may be uniquely identified. For example, the identification may be by an assigned identification number, a memory address at which it is listed, or any other conventional way in which to uniquely identify a particular stored data element. For a user, a corresponding user history 112 may be stored that identifies particular programs, program features, tasks, and/or subtasks of the list 108 used or performed by the user, or attempted to be used or performed by the user, e.g., with a memory address pointer or with a unique identification number. When the user attempts to or does use a program or program feature, or attempts to or does perform a task or subtask listed in the list 108, the system may update the user history 112 to include an identification of the event. Specifically, the system may update the user history 112 to indicate whether the task was successfully completed, failed, or was abandoned. A non-exhaustive list of additional information that may be stored in the user history 112 is a number of times a particular event has occurred, a date and/or time of the occurrence of the event, identifications of tips previously provided to the user, identification of particular ones of alternative methods used by the user for performing a task or subtask, and/or information regarding the user's role, e.g., manager, clerk, etc.

A plurality of user histories 112 may be stored, each for a different user. For example, users may log into a system that provides for access by the user to use programs. Each user may be assigned a different log-in ID. The log-in ID may be a username entered by the user during log-in. Alternatively, a plurality of terminals, which may each be uniquely identified, e.g., via a network address, may be provided with access to the system. For each username, or terminal, a corresponding user history 112 may be stored.

In an example embodiment of the present invention, for a user, the system may assign programs, program features, tasks, and/or subtasks (any one of which is referred to herein generally as a system element) to tip priority categories. The assignment may be based on data of the user history 112 corresponding to the user. The system may determine from the user history 112 which programs (or program features) and tasks (or subtasks) are most often used and performed by the user. Those that are most often used and performed, may be assigned a highest priority since they are deemed most relevant to the user. For example, the system may compare the use and performance numbers assigned to each of the system elements, and may sort them.

In one example embodiment, the system and method may sort a combination of the listed programs and tasks, and their sub-listings. In an alternative embodiment, programs and their sub-listings may be sorted separately from tasks and their sub-listings.

Example priority categories may be high, medium, and low. For example, each category may be fixedly assigned a predetermined interval of use and/or performance numbers. For example, if it is determined that a user used or attempted to use a program or performed or attempted to use a task a number of times that falls in an interval of 150 to 200, the program or task may be assigned a high priority; if it is determined that the user used or attempted to use a program or performed or attempted to use a task a number of times that falls in an interval of 100 to 149, the program or task may be assigned a medium priority; and if it is determined that the user used or attempted to use a program or performed or attempted to use a task a number of times that is less than 100, the program or task may be assigned a low priority.

In an alternative embodiment, the system may dynamically determine the tip priority categories based on the user's use and performance numbers. According to one exemplary calculation, the system may determine the range of the user's use and performance numbers, and may allocate predetermined percentages of the range to the different tip priority categories. Accordingly, if of a total of 100 listed programs and/or tasks, it is determined that a user used or performed one or more of them 0 times, one or more of them 199 times, and none more than 199 times, the system may determine the range to be 0-199. Consider this embodiment as applied to an instance where the predetermined percentages allocated to each of three categories is 25% to a high priority category, 25% to a low priority category, and 50% to a medium category. In this instance, the system may assign to the high priority category any listing for which the implementation number falls in an interval of 150 to 199; to the medium priority category any listing for which the implementation number falls in an interval of 50 to 149; and to the low priority category any listing for which the implementation number falls in an interval of 0 to 49. (An implementation number, as referred to herein, is either a use or performance number.)

Other variations for determining priority categories may be permissible. For example, a rule set according to which the priority categories may be determined may provide that at least a predetermined number of listings are to be assigned to a particular one of the categories. Further, it will be appreciated that the categories discussed above are provided as examples, and that the listings may be assigned instead to other categories. For example, they may be assigned to more than or less than the three categories discussed above.

In an embodiment of the present invention, the system may output tips of different categories at different frequencies. A particular frequency may be assigned to a particular category. Alternatively, the tips may be output according to a ratio of the categories to each other. For example, for every 3 output tips of high priority, 2 tips of medium priority and 1 tip of low priority may be output.

Instead of priority categories to which an interval of implementation numbers are assigned, tip priorities may be assigned directly to each listing according to a sort, so that for every implementation number, a different priority is assigned.

In an example embodiment of the present invention, one or more of the entries of the list 108 may be associated with one or more other entries of the list 108. For a particular entry having assigned a particular priority category, there may be a corresponding plurality of tips of the user help information 110. The tips may include one or more entries in the user help information 110 to which the particular entry of the list 108 directly corresponds and may also include entries in the user help information 110 to which directly corresponds those entries of the listing 108 with which the particular entry is associated. It may therefore occur that a tip that directly corresponds to an entry of the list 108 that is assigned to a low priority category based on its implementation number is output as a high priority tip.

Figure 2:
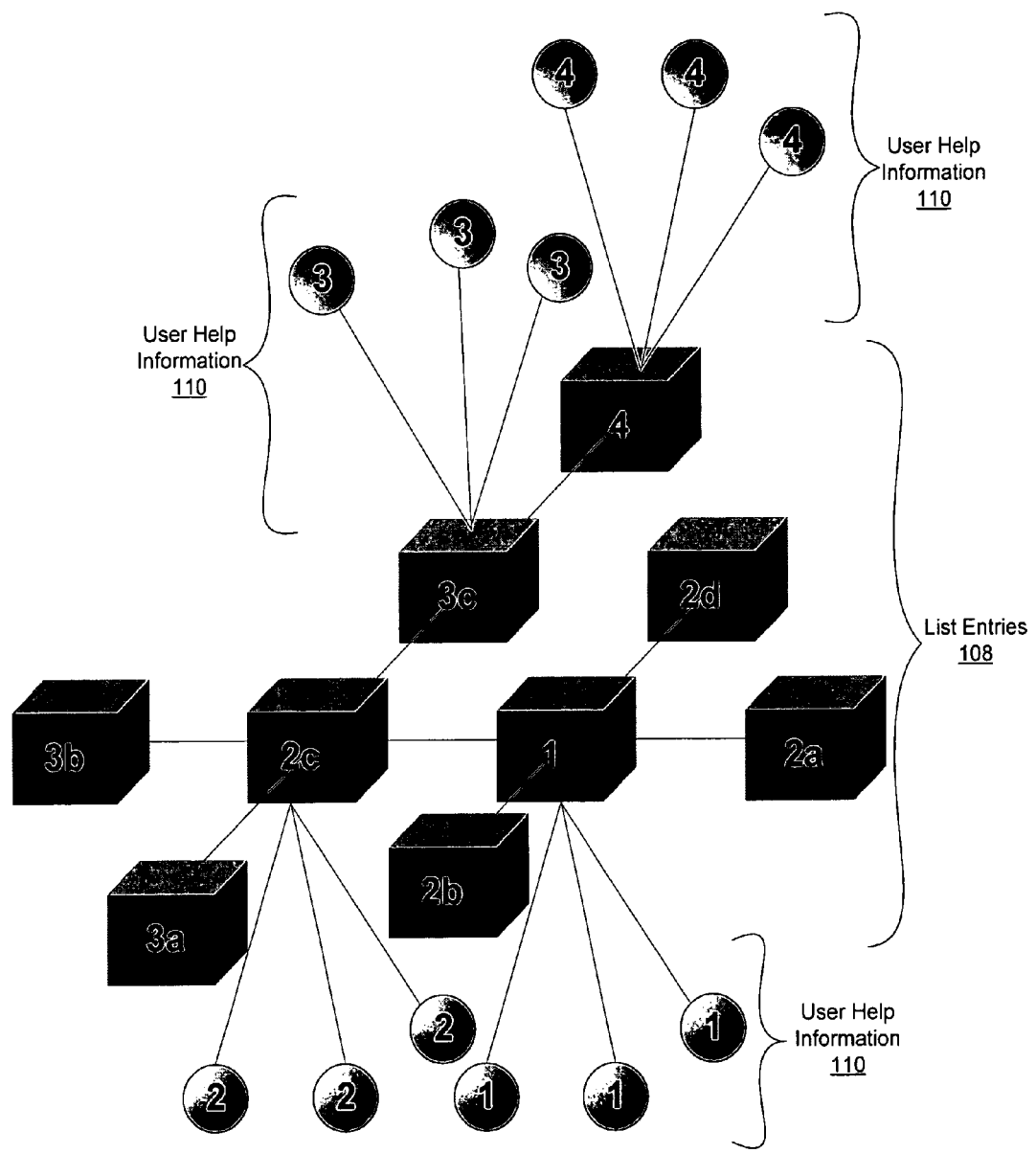
FIG. 2 is a map of an exemplary logical association of task, program, and tip entries according to an example embodiment of the present invention.

For example, FIG. 2 is a map of an exemplary logical association of entries of the list 108 (shown as boxes) to each other and to entries of the user help information 110 or tips (shown as circles). If entry (1) of list 108 is assigned to a high priority category, the entries (1) of user help information 110 may be output as high priority tips. Further, the entries (2) of the user help information 110 may be output as high priority tips since they are associated with an entry (2) of the list 108 with which the entry (1) of the list 108 is directly associated. Entries (4) of the user help information 110, however, may be output as low priority tips (depending on the priority category of the entry (4) of the list 108) since the entry (1) of the list 108 is not directly associated with the entry (4) of the list 108.

According to an example embodiment of the present invention, a number of steps removed from a source entry assigned to a high or higher priority category may be considered when determining a priority category of an entry of the list 108. It is noted that the steps removed does not refer to a sequence of the listing, but rather to the entries' logical associations. A source entry may be an entry for which a priority category is determined without consideration of a number of steps that the entry is removed from another entry. In one example embodiment, an entry may be assigned two categories. A first category may be that which is determined without consideration of steps of removal from another entry and a second category may be that which is determined with consideration of steps of removal. The first category of a particular entry may be used for determining a priority category of an entry one step removed from the particular entry, while the second category may be used for determining how the tips associated with the particular entry are to be output. For example, if entries (3) and (4) of the list 108 have implementation numbers that are the same or that fall in the same interval, and that correspond to a low priority category, entry (3) of the list 108 may nevertheless be assigned to higher priority category with respect to output of tip entries than that of entry (4) of the list 108, since entry (3) is only 2 steps removed from entry (1), while entry (4) is 3 steps removed from entry (1). An entry of the list 108 that is not itself directly associated with any user help information 110 may cause a raising of priority of another entry of the list 108 that is directly associated with user help information 110. For example, if entry (3*a*) is a program feature used very often by a user, then the priority of entry (2*c*), or, more specifically, the priority of user help information (2), may be raised based on its association with entry (3*a*). It will be appreciated that other variations of the extent to which steps of removal are considered are possible. In particular, an entry may be associated with a plurality of other entries and may therefore stem from a plurality of source entries of higher priority categories. A rule set may provide for consideration of a highest category source entry, a closest source entry, or some combination thereof.

In an embodiment of the present invention, the entries 108 are not assigned priorities, but, instead, may be assigned degrees of relevance. The user help information 110 may be assigned priorities based on the degrees of relevance of the entries 108 with which the user help information 110 is associated. As used herein, the terms "priority" and "priorities" with respect to the entries 108 refer to actual priorities or to degrees of relevance.

In one example embodiment, a particular entry of the list 108 may affect the determination of a priority category of a neighboring entry, in additional ways. Further, the way a first entry affects its neighboring entries may be different than the way a second entry affects its neighboring entries. The system may refer to a stored rule set to determine how each entry is affected by or affects its neighboring entries. For example, for a particular entry, a large disparity between its implementation number and that of its neighbor may raise the priority category of the neighboring entry. Different disparity numbers may be used for different entries, and not used at all for others. Further, a particular disparity number used may depend on the number of an entry's neighboring entries. For example, a greater disparity number may be used for determining an effect of entry (3) of the list 108 on its neighboring entries, than a disparity number used for determining an effect of entry (1) of the list 108 on its neighboring entry. Further, implementation numbers of other neighboring entries of a particular entry's neighboring entry may be considered.

For example, entry (1) of the list 108 may represent a task. Entries (2) of the list 108 may represent particular subtasks used for accomplishing the task represented by (1). If it is determined that a subtask corresponding to entry (2*a*) is implemented, e.g., for 90% of the implementations of the task corresponding to entry (1), then one or more of entries (2*b*-2*d*) may be assigned to a higher priority category than they otherwise would. In another instance, the rule set may indicate that entry (2*b*) is to be assigned to a higher priority category if it is determined that its corresponding subtask is implemented, e.g., for less than 2% of the implementations of the task corresponding to entry (1). These are but a couple of a plethora of calculations that may be made depending on a rule set.

In an embodiment of the present invention, the system may take additional factors into consideration when determining a tip's priority. For example, a high implementation number may render an entry of the list 108 a high priority entry (high degree of relevance), but the high implementation number, or even any implementation number above zero, may render an entry of the user help information 110 that directly corresponds to the high priority entry of the list 108 a low priority entry of the user help information 110, since its implementation may indicate the user's proficiency with respect to the entry, i.e., its implementation may indicate that the user is already aware of the contents of the tip. In particular, whether the implementation was completed or otherwise abandoned or failed may be taken into consideration.

In one example embodiment, different users may be assigned different roles. The user history 112 may identify a user's role. The particular tips provided, the determination as to a tip's priority, and/or the determination as to a priority of a system element of the list 108 may vary depending on the user's identified role. For example, the user history 112 and the method of providing user help tips based on the user history 112 may be provided for a company portal. Company employees may log into the portal. A user history 112 may be maintained for each company employee, and may identify the employee's role in the company. A rule set may provide that one or more tips are to be output for employees of a first role but not for employees of a second role. Further, by default, certain programs, program features, tasks, and/or subtasks may be assigned particular priority categories depending on the employee's role. For example, it may be determined that an employee of a first role usually uses a particular program, while an employee of a second role usually does not. Accordingly, tips pertaining to the particular program would be particularly relevant to the employee of the first role, but not to the employee of the second role. For example, a supervisor may often use a program for managing a queue of requests generated by a number lower level employees. The lower level employees may use the program less often, and may even be denied access to the program. In one embodiment, the user may customize priorities of different programs and/or program aspects, or may customize them partially by indicating a user priority preference to be assigned a coefficient in calculating an overall priority. For example, the system may multiply each of a plurality of priority determining factors, e.g., including a user-indicated priority, by corresponding coefficients when determining an overall priority category.

In an example embodiment of the present invention, which program and/or program aspect, if any, set by a user as the user's homepage may be a factor in determining the program's or program aspect's tip priority. For example, even if the user has not used a particular program a significant number of times, the program's relevance to the user may be determined by the system to be high since the user set the program as the user's homepage. In one variant of this embodiment, if the user changes the homepage to another program, the program previously set as the homepage may be assigned a lower priority than the newly set program, but may be assigned a higher priority than other programs because of its having been previously set as the homepage.

In an example embodiment of the present invention, a timestamp of an implementation of a particular system element may be taken into consideration for determining the priority of the system element. For example, if a recorded implementation number of a first program is greater than that of a second program, but all, most, or a last of the implementations of the first program occurred at a much earlier time than all, most, or a last of the implementations of the second program, the second program may be assigned to a higher priority category. In one exemplary application of this embodiment, a formula may be applied where an implementation number is multiplied by another number that is decremented by a predetermined amount for each passing day since a last implementation. In one embodiment, a most recently used program or program aspect may be assigned a highest priority.

In one example embodiment, programs and/or program aspects with respect to which a user encountered an error, erroneous action, or problem may be assigned to a higher priority than other programs or program aspects that are used without the user encountering any problem. Alternatively, encountering an error or problem may be one of the considered factors for the assignment of priorities.

Consider the foregoing embodiments as applied to an exemplary installation in which the system provides for the management of Purchase Orders (P.O.). The system may provide for generating a P.O. Within an electronic P.O. form, a number of fields may be provided, of which one may be a drop-down box including a list of possible suppliers. The system may provide a way for the user to set a default supplier to be automatically selected. With reference to the user history 112, the system may determine that the user has set up a default supplier. The system may therefore refrain from providing a tip that informs the user of a method of setting up a default supplier.

If the system determines based on the user history 112 that the user has not set up a default supplier, the system may provide the tip to the user. However, the system may refrain from doing so, or may assign the tip a low priority, if the system determines that the tip is not relevant. For example, in one embodiment, the system may assign a high priority to a tip for informing a user of a shortcut method only if the system determines that the user has instead performed a longer method numerous times. For example, if the system determines from the user history that the user has not used the part of the system that facilitates generation of a P.O., or if the system determines that the user has used that portion of the system, but has not selected a same supplier from the drop-down box significantly more times than the user has selected one or more other suppliers, then the system may determine that the user has not used a long method a significant number of times, and may therefore assign the tip a low priority. However, if the system determines that the user has selected a same supplier a number of times more than any of the other suppliers, e.g., where the number of times exceeds a predetermined threshold value, or where the ratio of the supplier's selection to the other suppliers' sections exceeds a threshold value, then the system may assign the tip a high priority.

In one embodiment, the tip may be shown daily or after predetermined time intervals. In one embodiment, the system may display the tip when the user performs a task or uses a program to which the tip relates. For example, for each new task the user performs or for each program the user uses, the system may select based on the user history 112 a particular tip that relates to the task and/or program and display it at that time. In one embodiment, the system may choose for display only one tip a day or per log-in but may refrain from displaying it until the user performs a particular task or uses a particular program to which the tip relates. If the tip relates to the overall system, the tip may be displayed immediately at log-in, but if the tip relates to setting up a default supplier, the system may wait until the user opens the P.O. generation part of the system before displaying the tip.

In one example embodiment, the tips may be cycled. Once used, a tip is moved to the end of the cycle. In one example embodiment, the cycle may include all tips of all categories, so that once a high priority tip is used, it may be moved to a position in the cycle behind a lower priority tip. Alternatively, separate cycles may be maintained for the different priority categories.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for providing user help tips to a user of a computer system, comprising:
    determining, based on a user history, a relevance of a particular one of a plurality of tips to a user; and
    assigning to the particular tip a priority category in accordance with the relevance;
    wherein:
        a program provides for accomplishing a task via alternative routes;
        a first system element is usable for a first one of the alternatives and not for a second one of the alternatives;
        a second system element is usable for the second one of the alternatives and not usable for the first one of the alternatives; and
        the method further comprises:
            determining based on the user history that, for accomplishing the task, the user implemented the first system element a number of times more than a second system element, the number exceeding a predefined threshold value; and
            based on the determination that the user implemented the first system element the number of times more than the second system element, outputting a tip regarding the second system element.

2. The method of claim 1, further comprising:
    displaying a plurality of tips for the user over time so that a frequency at which tips of a first category are output and a frequency at which tips of a second category are output meet a predetermined ratio.

3. The method of claim 1, wherein the relevance is determined based on a recorded implementation number of a system element with which the particular tip is associated.

4. The method of claim 3, wherein the system element is one of a program, a program feature, a task, and a sub-task.

5. The method of claim 3, wherein, for a lapse of a predetermined amount of time since a last implementation of the system element, the relevance is diminished.

6. The method of claim 3, further comprising:
determining a range of values of implementation numbers of a plurality of system elements;
dividing the range into a plurality of value intervals;
assigning each value interval to a corresponding priority category; and
assigning the system element to the priority category to which a value interval in which the system element's recorded implementation number falls;
wherein the relevance is determined based on the priority category of the system element.

7. The method of claim 1, further comprising:
based on priority categories of the plurality of tips, outputting for the user tips relating to a first system element more frequently than tips relating to a second system element where the user implements the first system element more often than the second system element.

8. A method for providing user help tips to a user of a computer system, wherein a program provides for accomplishing a task via alternative routes, a first system element is usable for a first one of the alternative routes and not for a second one of the alternative routes, and a second system element is usable for the second one of the alternative routes and not usable for the first one of the alternative routes, the method comprising:
determining, based on a user history, that, for accomplishing the task, the user implemented the first system element a number of times more than the second system element, the number exceeding a predefined threshold value; and
based on the determination that the user implemented the first system element the number of times more than the second system element, outputting a tip regarding the second system element.

9. The method of claim 8, wherein the task is to select a supplier, the first system element is one or more program steps for choosing from a list of suppliers, and the second system element is one or more program steps for using a supplier designated as a default supplier.

10. A computer-readable medium having stored thereon instructions adapted to be executed by a processor, the instructions which, when executed, cause the processor to perform the method of claim 1.

11. The method of claim 8, wherein, for a user:
at least one of a plurality of system elements is automatically prioritized based on a user history;
at least one of a plurality of tips is prioritized based on an association of the tip with a prioritized system element; and
a tip is output according to its prioritization.

12. The method of claim 11, wherein the at least one system element is prioritized based on at least one of a number of times it has been implemented, a recorded role of the user, a timestamp of one or more of its implementations, and its association with another system element.

13. The method of claim 11, wherein the plurality of system elements include at least one of a program, a program feature, a task, and a sub-task.

14. The method of claim 13, wherein the prioritization of the at least one tip is further based on a comparison of a number of times the system element with which the at least one tip is associated is implemented with a number of times another system element is implemented.

15. The method of claim 14, wherein, if the number of times the system element with which the at least one tip is associated is implemented is less than the number of times the another system element is implemented, a priority of the at least one tip is heightened.

16. The method of claim 15, wherein the priority of the at least one tip is heightened based on the number of times the system element with which the at least one tip is associated is implemented being less than the number of times the another system element is implemented upon a condition that an amount by which it is less exceeds one of a predetermined threshold amount and a predetermined threshold ratio.

17. The method of claim 11, wherein:
a priority of a system element is heightened in accordance with a number of steps by which the system element is removed from a source system element having a higher priority; and
the number of steps by which it is removed is determined based on a predefined interrelationship of the plurality of system elements, the more intervening system elements via which the system element is related to the source element, the greater the number of steps by which the system element is considered removed from the source system element.

18. The method of claim 11, further comprising:
based on a user role recorded in the user history, determining whether the user has access to a particular system element;
wherein, for the user, a tip associated with the particular system element is output upon a condition that the user has access to the particular system element.

19. The method of claim 11, wherein, based on the prioritization of the tips, tips relating to a first system element are output for the user more frequently than tips relating to a second system element where the user implements the first system element more often than the second system element.

20. A computer system for providing user help tips to a user, comprising:
a hardware memory device for storing:
a program that provides for accomplishing a task via alternative routes, and that provides a plurality of system elements including (a) a first system element usable for a first one of the alternative routes and not for a second one of the alternative routes and (b) a second system element usable for the second one of the alternative routes and not for the first one of the alternative routes;
a plurality of tips, each tip associated with at least one of the plurality of system elements; and
a user history including information regarding a user's use of the system elements;
a first arrangement configured to determine, based on the user history, that for accomplishing the task, the user implemented the first system element a number of times more than the second system element, the number exceeding a predefined threshold value; and
a second arrangement for, based on the determination that the user implemented the first system element the number of times more than the second system element, outputting a tip regarding the second system element.

21. The computer system of claim 20, wherein:
a priority of at least one tip is determined based on a use of a first system element with which the at least one tip is directly associated and a use of a second system element with which the at least one tip is indirectly associated; and
the indirect association is defined by an association of the first system element with which the at least one tip is associated with the second system element with which the at least one tip is associated.

22. The computer system of claim 20, wherein an increase in a use of a system element with which a particular tip is directly associated causes a decrease in the particular tip's priority.

23. The computer system of claim 20, wherein the user history further includes an identification of a role assigned to the user, and the system bases a priority of at least one of the tips on the user's indicated role.

24. A computer-readable medium having stored thereon instructions adapted to be executed by a processor, the instructions which, when executed, cause the processor to perform the method of claim 8.

* * * * *